(12) United States Patent
Cheng et al.

(10) Patent No.: US 11,099,675 B1
(45) Date of Patent: Aug. 24, 2021

(54) DISPLAY DEVICE, OPERATION METHOD, DRIVING CIRCUIT AND TIMING CONTROL CIRCUIT

(71) Applicant: Novatek Microelectronics Corp., Hsinchu (TW)

(72) Inventors: Yen-Cheng Cheng, Hsinchu (TW); Hsiu-Hui Yang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/856,043

(22) Filed: Apr. 23, 2020

(51) Int. Cl.
*G06F 3/041* (2006.01)
*G09G 3/20* (2006.01)

(52) U.S. Cl.
CPC ......... *G06F 3/0412* (2013.01); *G09G 3/2088* (2013.01); *G09G 2310/0264* (2013.01); *G09G 2310/08* (2013.01)

(58) Field of Classification Search
CPC ................ G06F 3/0412; G09G 3/2088; G09G 2310/0264; G09G 2310/08
See application file for complete search history.

(56) References Cited

U.S. PATENT DOCUMENTS

| 10,209,815 | B2 * | 2/2019 | Chan | .................. | G09G 3/3677 |
| 10,613,660 | B2 | 4/2020 | Kang et al. | | |
| 2014/0071062 | A1 | 3/2014 | Fang | | |
| 2017/0123529 | A1 * | 5/2017 | Ho | ........................ | G06F 3/0416 |
| 2018/0059855 | A1 * | 3/2018 | Gwon | ................. | G06F 3/04164 |
| 2018/0120996 | A1 | 5/2018 | Kang et al. | | |
| 2020/0192515 | A1 | 6/2020 | Kang et al. | | |
| 2020/0257399 | A1 * | 8/2020 | Guo | ...................... | G06F 3/1407 |

FOREIGN PATENT DOCUMENTS

| CN | 106356014 | 9/2019 |
| TW | 201411438 | 3/2014 |
| TW | I660297 | 5/2019 |
| TW | I686733 | 3/2020 |
| TW | I707260 | 10/2020 |

OTHER PUBLICATIONS

"Office Action of Taiwan Counterpart Application", dated Dec. 7, 2020, p. 1-p. 12.

* cited by examiner

*Primary Examiner* — Bryan Earles
(74) *Attorney, Agent, or Firm* — JCIPRNET

(57) ABSTRACT

A display device, an operation, a driving circuit and a timing control circuit are provided. The display device includes a touch display panel, the driving circuit and the timing control circuit. The driving circuit drives the touch display panel to display image frames and perform touch detection. The timing control circuit outputs display data to the driving circuit through a data transmission path during a display period to display the image frame on the touch display panel. The driving circuit outputs touch detection data corresponding to the touch detection to the timing control circuit through the same data transmission path during a touch detection period.

12 Claims, 3 Drawing Sheets

DISPLAY DEVICE, OPERATION METHOD, DRIVING CIRCUIT AND TIMING CONTROL CIRCUIT

BACKGROUND

Field of the Invention

The invention relates to an electronic apparatus and more particularly, to a display device and an operation method thereof, a driving circuit and a timing control circuit.

Description of Related Art

A touch display panel is commonly applied in various kinds of electronic devices. Besides a display function, the touch display panel may further provide a touch detection function. The timing controller may output display data to display driving circuits through a first group of data transmission paths, and then, the display driving circuits may drive the touch display panel according to the display data, so as to display image frames on the touch display panel. Touch driving circuits may drive the touch display panel to perform touch detection. The touch driving circuits may output touch detection data corresponding to the touch detection to a micro control unit (MCU) through a second group of data transmission paths (which are different from the first group of data transmission paths). The MCU may process the touch detection data to acquire a position of a certain touch event on the touch display panel.

As a size of the touch display panel is increased, the number of the display driving circuits also has to be correspondingly increased, and as a result, the number of the first group of data transmission paths between the timing controller and the display driving circuits also has to be correspondingly increased. The increase of the number of the first group of data transmission paths means that the timing controller has to be disposed with more pins and pads. Similarly, the number of the touch driving circuits has to increased, and as a result, the number of the second group of data transmission paths between the MCU and the touch driving circuits also has to be correspondingly increased. The increase of the number of the second group of data transmission paths means that the MCU has to be disposed with more pins and pads. Moreover, the large amount of transmission paths occupy a large area of a printed circuit board (PCB).

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a display device, an operation method, a driving circuit and a timing control circuit which can reduce the number of data transmission paths as many as possible.

According to the invention, a display device including a touch display panel, a driving circuit and a timing control circuit is provided. The driving circuit is coupled to the touch display panel. The driving circuit drives the touch display panel to display an image frame and perform touch detection. The timing control circuit is coupled to the driving circuit. The timing control circuit outputs display data to the driving circuit through a data transmission path during a display period to display an image frame on the touch display panel. The driving circuit outputs touch detection data corresponding to the touch detection to the timing control circuit through the same data transmission path during a touch detection period.

According to the invention, an operation method of a display device including a touch display panel, a driving circuit and a timing control circuit is provided. The operation method includes: outputting, by the timing control circuit, display data to the driving circuit through a data transmission path during a display period; driving, by the driving circuit, the touch display panel according to the display data, so as to display an image frame on the touch display panel; driving, by the driving circuit, the touch display panel, so as to perform touch detection; and outputting, by the driving circuit, touch detection data corresponding to the touch detection to the timing control circuit through the same data transmission path during a touch detection period.

According to the invention, a driving circuit including a pin, a display driving circuit and a touch driving circuit is provided. The display driving circuit is coupled to the pins, so as to receive display data during a display period. The display driving circuit is configured to drive the touch display panel according to the display data to display an image frame on the touch display panel. The touch driving circuit is coupled to the same pins. The touch driving circuit is configured to drive the touch display panel to perform touch detection. During a touch detection period, the touch driving circuit outputs touch detection data corresponding to the touch detection to the same pins.

According to the invention, a timing control circuit including a plurality of pins, a timing controller and a micro control unit (MCU) is provided. The timing controller is coupled to the pins. The timing controller is configured to output display data to the pins during a display period. The MCU is coupled to the same pins. The MCU is configured to receive touch detection data corresponding to touch detection from the same pins during a touch detection period.

Based on the above, the display device described in the embodiments of the invention can time-divisionally share the data transmission path between the driving circuits and the timing control circuit. As for the same data transmission path, it can facilitate transmitting the display data from the timing control circuit to the driving circuit during the display period and transmitting the touch detection data from the driving circuit to the timing control circuit during the touch detection period. Because the data transmission path is time-divisionally shared, the number of the data transmission paths can be reduced as many as possible.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

Figure 1:
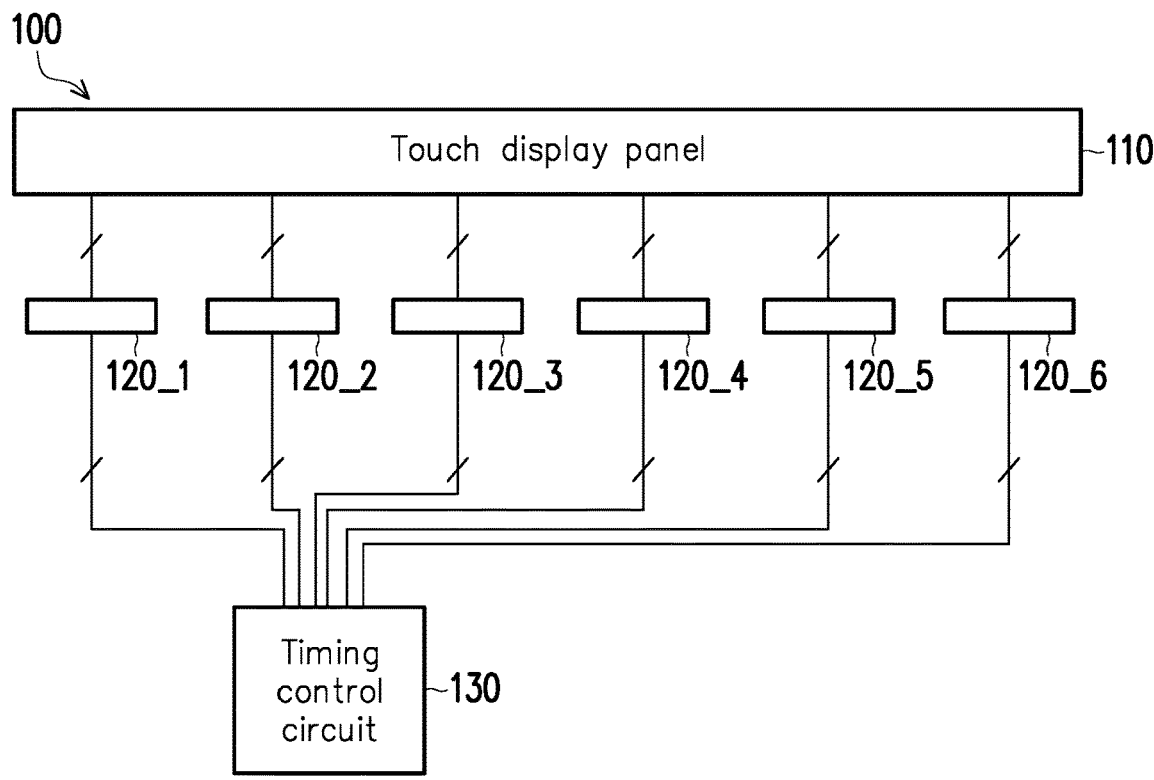
FIG. 1 is a schematic circuit block diagram illustrating a display device according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a display device 100 according to an embodiment of the invention. In the embodiment illustrated in FIG. 1, the display device 100 includes a touch display panel 110. The implementation manner of the touch display panel 110 is not limited in the present embodiment. For example, based on a design requirement, the touch display panel 110 may be a conventional touch display panel or other touch display panels. Besides a display function, the touch display panel 110 may further provide a touch detection function.

In the embodiment illustrated in FIG. 1, the display device 100 further includes drive circuits 120_1, 120_2, 120_3, 120_4, 120_5 and 120_6. The driving circuits 120_1 to 120_6 are coupled to the touch display panel 110. The driving circuits 120_1 to 120_6 are integrated with a display driving function and a touch driving function. The driving circuits 120_1 to 120_6 may drive the touch display panel 110 to display image frames and perform the touch detection. It should be noted that the number of the driving circuits 120_1 to 120_6 may be determined based on a design requirement. The implementation manner of the driving circuits 120_1 to 120_6 is not limited in the invention. For example, based on a design requirement, any one of the driving circuits 120_1 to 120_6 may include a touch with display driver integration (TDDI) chip and/or other driving circuits.

Figure 2:
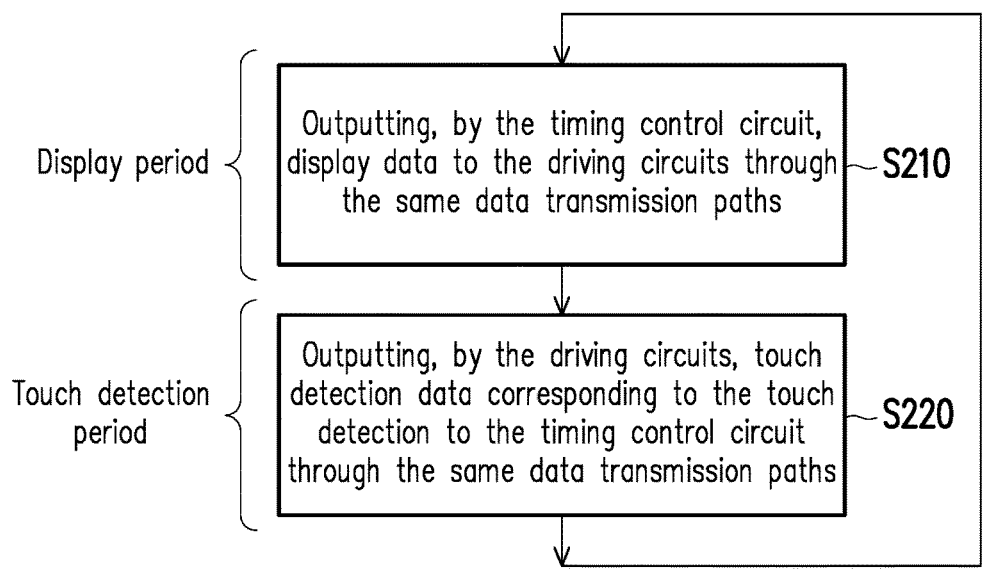
FIG. 2 is a flowchart illustrating an operation method of a display device according to an embodiment of the invention.

FIG. 2 is a flowchart illustrating an operation method of a driving device according to an embodiment of the invention. Referring to FIG. 1 and FIG. 2, the display device 100 further includes a timing control circuit 130. The timing control circuit 130 is coupled to the driving circuits 120_1 to 120_6. During a display period, the timing control circuit 130 may output display data to the driving circuits 120_1 to 120_6 through a plurality of data transmission paths (step S210), and the driving circuits 120_1 to 120_6 may drive the touch display panel 110 according to the display data to display image frames on the touch display panel 110. During a touch detection period, the driving circuits 120_1 to 120_6 may drive the touch display panel 110 to perform touch detection and output touch detection data corresponding to the touch detection to the timing control circuit 130 through the same data transmission paths (step S220).

Figure 3:
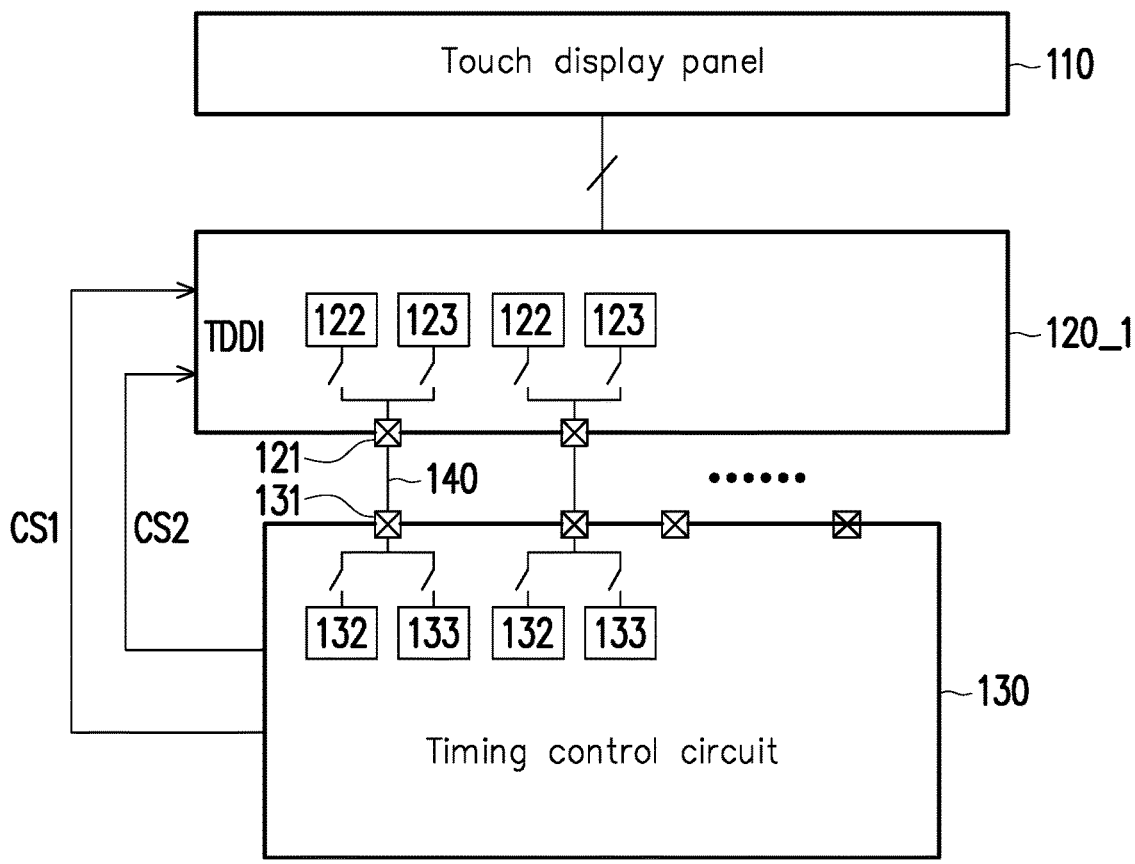
FIG. 3 is a schematic circuit block diagram illustrating the driving circuit and the timing control circuit depicted in FIG. 1 according to an embodiment of the invention.

FIG. 3 is a schematic circuit block diagram illustrating the driving circuit 120_1 and the timing control circuit 130 depicted in FIG. 1 according to an embodiment of the invention. The rest of the driving circuits 120_2 to 120_6 illustrated in FIG. 1 may be inferred with reference to the description related to the driving circuit 120_1 and thus, will not be repeated. A plurality of data transmission paths may be provided between the driving circuit 120_1 and the timing control circuit 130. In the embodiment illustrated in FIG. 3, one of wires 140 may be employed as one of the data transmission paths, and the rest of the data transmission paths may be inferred analogously with reference to the description related to the wire 140 and thus, will not be repeated.

Two ends of the wire 140 are respectively coupled to a pin (or a pad) 121 of the driving circuit 120_1 and a pin (or a pad) 131 of the timing control circuit 130. During the display period, the timing control circuit 130 may output the display data to the driving circuit 120_1 through the pin 131, the wire 140 and the pin 121. During the touch detection period, the driving circuit 120_1 may output the touch detection data to the timing control circuit 130 through the pin 121, the wire 140 and the pin 131.

Based on the above, the display device 100 described above may time-divisionally share the wires 140 (the data transmission paths) between the driving circuit 120_1 and the timing control circuit 130. As for the same wire 140 (the data transmission path), it may facilitate transmitting the display data from the timing control circuit 130 to the driving circuit 120_1 during the display period and transmitting the touch detection data from the driving circuit 120_1 to the timing control circuit 130 during the touch detection period. Because the wires 140 (the data transmission paths) are time-divisionally shared, the number of wires (the data transmission paths) between the driving circuit 120_1 and the timing control circuit 130 may be reduced as many as possible.

In the embodiment illustrated in FIG. 3, the driving circuit 120_1 includes display driving circuits 122 and touch driving circuits 123. Each display driving circuit 122 is coupled to the pin 121 of the drive circuit 120_1 through a routing circuit (e.g., a switch), so as to receive the display data provided by the timing control circuit 130 during the display period. The display driving circuits 122 may drive the touch display panel 110 according to the display data to display image frames on the touch display panel 110. Implementation details of the display driving circuits 122 are not limited in the invention. For example, based on a design requirement, the display driving circuits 122 may include conventional source drivers and (or) other display driving circuits.

The touch driving circuits 123 may drive the touch display panel 110, so as to perform the touch detection during the touch detection period. Each touch driving circuit 123 is coupled to the pin 121 of the drive circuit 120_1 through a routing circuit (e.g., a switch), so as to output the touch detection data corresponding to the touch detection to the same pin 121. Thus, during the touch detection period, the touch driving circuit 123 may output the touch detection data corresponding to the touch detection to the timing control circuit 130 through the pin 121 and the wire 140. Implementation details of the touch driving circuits 123 are not limited in the invention. For example, based on a design requirement, the touch driving circuits 123 may include conventional touch driving circuits and (or) other touch driving circuits.

In the embodiment illustrated in FIG. 3, the timing control circuit 130 includes a timing controller 132 and a micro control unit (MCU) 133. The timing controller 132 is coupled to the pin 131 of the timing control circuit 130 through a routing circuit (e.g., a switch), so as to output the display data to the pin 131 of the timing control circuit 130 during the display period. Thus, during the display period, the timing controller 132 may output the display data to the driving circuit 120_1 through the pins 131 and the wires 140. Implementation details of the timing controller 132 are not limited in the present embodiment. For example, based on a design requirement, the timing controller 132 may be conventional timing controller or other control circuit.

The MCU 133 is coupled to the pin 131 of the timing control circuit 130 through a routing circuit (e.g., a switch), so as to receive the touch detection data provided by driving circuit 120_1. The MCU 133 may execute a touch algorithm on the touch detection data, to acquire a position of a touch event on the touch display panel 110. Implementation details of the touch algorithm are not limited in the present embodiment. For example, based on a design requirement, the touch algorithm may be a conventional algorithm or other algorithms.

Figure 4:
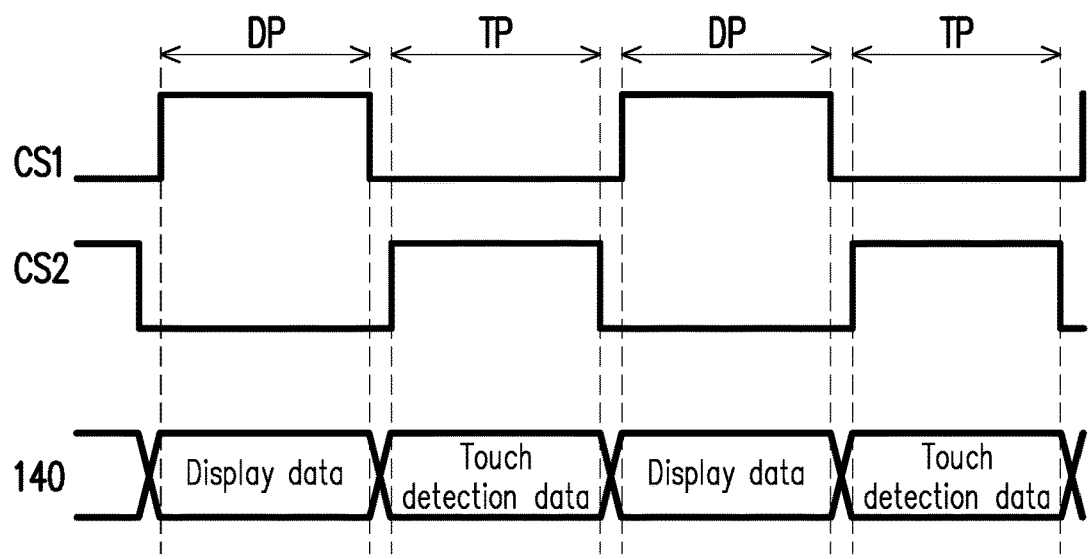
FIG. 4 is a schematic timing diagram illustrating control signals depicted in FIG. 3 according to an embodiment of the invention.

FIG. 4 is a schematic timing diagram illustrating control signals CS1 and CS2 depicted in FIG. 3 according to an embodiment of the invention. Referring to FIG. 3 and FIG. 4, the timing control circuit 130 may further output the control signals CS1 and CS2 to the driving circuit 120_1. The control signal CS1 is configured to indicate a display period DP, and the control signal CS2 is configured to indicate a touch detection period TP. During the display period DP, the timing controller 132 of the timing control circuit 130 may output the display data to the display driving circuits 122 of the driving circuit 120_1 through the pins 131, the wires 140 and the pins 121. During the touch detection period TP, the touch driving circuits 123 of the drive circuit 120_1 may output the touch detection data corresponding to the touch detection to the MCU 133 of the timing control circuit 130 through the pins 121, the wires 140 and the pins 131. The MCU 133 may execute a touch algorithm on the touch detection data to acquire a position of a touch event on the touch display panel 110. Implementation details of the touch algorithm are not limited in the present embodiment. For example, based on a design requirement, the touch algorithm may be a conventional algorithm or other algorithms.

Figure 5:
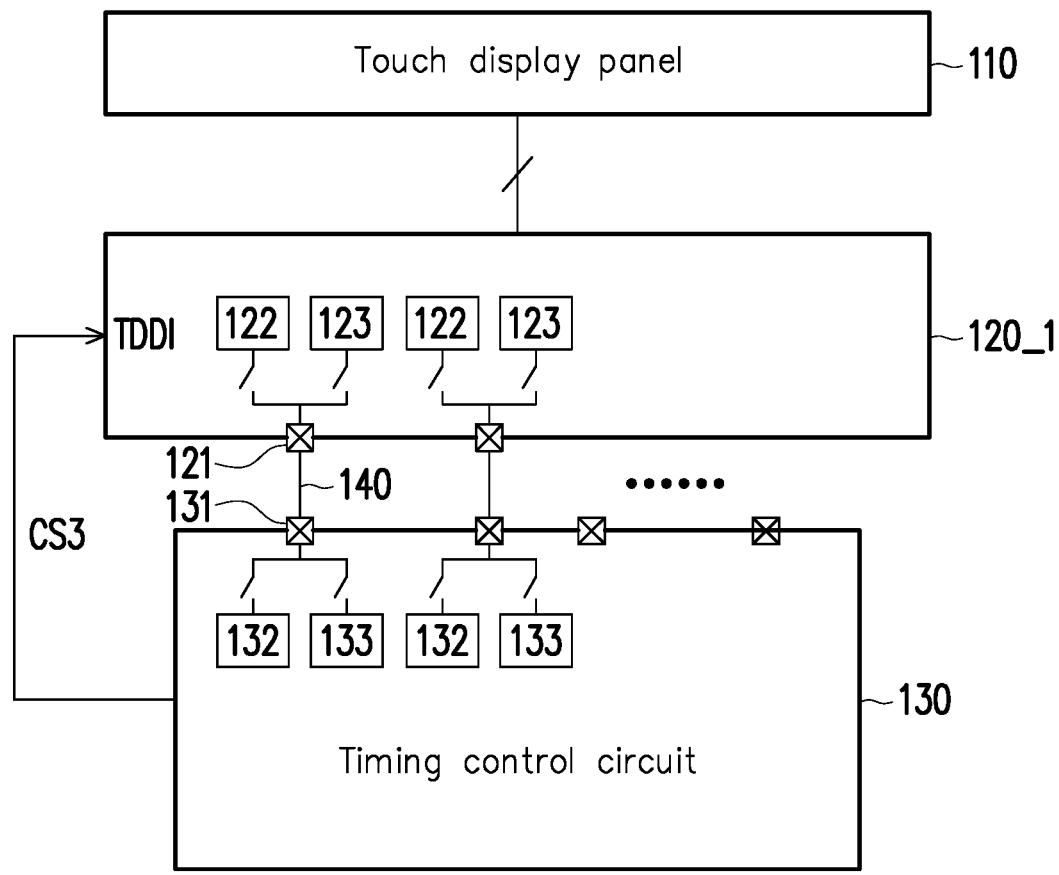
FIG. 5 is a schematic circuit block diagram illustrating the driving circuit and the timing control circuit depicted in FIG. 1 according to another embodiment of the invention.

FIG. 5 is a schematic circuit block diagram illustrating the driving circuit 120_1 and the timing control circuit 130 depicted in FIG. 1 according to another embodiment of the invention. The driving circuit 120_1, the timing control circuit 130 and the wires 140 illustrated in FIG. 3 may be inferred with reference to the descriptions related to the driving circuit 120_1, the timing control circuit 130 and the wires 140 illustrated in FIG. 3 and thus, will not be repeated. In the embodiment illustrated in FIG. 5, the timing control circuit 130 may further output a control signal CS3 to the driving circuit 120_1.

Figure 6:
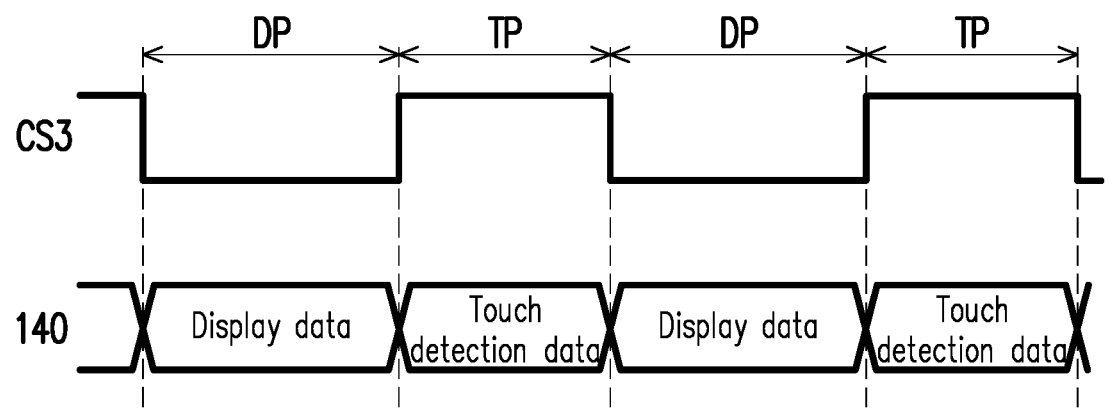
FIG. 6 is a schematic timing diagram illustrating the control signal depicted in FIG. 5 according to an embodiment of the invention.

FIG. 6 is a schematic timing diagram illustrating the control signal CS3 depicted in FIG. 5 according to an embodiment of the invention. Referring to FIG. 5 and FIG. 6, the control signal CS3 is configured to indicate that the timing control circuit 130 is currently operation in the display period DP or in the touch detection period TP. During the display period DP, the timing controller 132 of the timing control circuit 130 may output the display data to the driving circuits 120_1 of the display driving circuit 122 through the pins 131, the wires 140 and the pins 121. During the touch detection period TP, the touch driving circuits 123 of the drive circuit 120_1 may output the touch detection data corresponding to the touch detection to the MCU 133 of the timing control circuit 130 through the pins 121, the wires 140 and the pins 131.

Based on different design demands, the blocks of the driving circuit 120_1, the display driving circuits 122, the touch driving circuits 123, the timing control circuit 130, the timing controller 132 and (or) the MCU 133 may be implemented in a form of hardware, firmware, software (i.e., programs) or in a combination of many of the aforementioned three forms.

In terms of the hardware form, the blocks of the driving circuit 120_1, the display driving circuits 122, the touch driving circuits 123, the timing control circuit 130, the timing controller 132 and (or) the MCU 133 may be implemented in logic and analog circuits on an integrated circuit. Related functions of the driving circuit 120_1, the display driving circuits 122, the touch driving circuits 123, the timing control circuit 130, the timing controller 132 and (or) the MCU 133 may be implemented in the form of hardware by utilizing hardware description languages (e.g., Verilog HDL or VHDL) or other suitable programming languages. For example, the related functions of the driving circuit 120_1, the display driving circuits 122, the touch driving circuits 123, the timing control circuit 130, the timing controller 132 and (or) the MCU 133 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the driving circuit 120_1, the display driving circuits 122, the touch driving circuits 123, the timing control circuit 130, the timing controller 132 and (or) the MCU 133 may be implemented as programming codes. For example, the driving circuit 120_1, the display driving circuits 122, the touch driving circuits 123, the timing control circuit 130, the timing controller 132 and (or) the MCU 133 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programmable logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, the display device described in the embodiments of the invention can time-divisionally share the data transmission paths between the driving circuits and the timing control circuit. As for the same data transmission path (the wire 140), it can facilitate transmitting the display data from the timing control circuit to the driving circuit during the display period and transmitting the touch detection data from the driving circuit to the timing control circuit during the touch detection period. Because the same data transmission paths are time-divisionally shared, the number of the data transmission paths between the driving circuits and the timing control circuit can be reduced as many as possible.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device, comprising:
    a touch display panel;
    a driving circuit, coupled to the touch display panel, wherein the driving circuit drives the touch display panel to display an image frame and perform touch detection; and
    a timing control circuit, coupled to the driving circuit, wherein the timing control circuit outputs display data through a data transmission path between the timing control circuit and the driving circuit during a display period to display the image frame on the touch display panel, and the driving circuit outputs touch detection data corresponding to the touch detection through the same data transmission path between the timing control circuit and the driving circuit during a touch detection period.

2. The display device according to claim 1, wherein the driving circuit comprises a touch with display driver integration chip.

3. The display device according to claim 1, wherein the driving circuit drives the touch display panel to display the image frame during the display period, and the driving circuit drives the touch display panel to perform the touch detection during the touch detection period.

4. The display device according to claim 1, further comprising:
    a wire, employed as the data transmission path, wherein two ends of the wire are respectively coupled to a first pin of the driving circuit and a second pin of the timing control circuit, the timing control circuit outputs the display data to the driving circuit through the second pin, the wire and the first pin during the display period, and the driving circuit outputs the touch detection data to the timing control circuit through the first pin, the wire and the second pin during the touch detection period.

5. The display device according to claim 4, wherein the driving circuit comprises:
    a display driving circuit, coupled to the first pin of the driving circuit, so as to receive the display data during the display period, and configured to drive the touch display panel to display the image frame according to the display data; and
    a touch driving circuit, coupled to the first pin, and configured to drive the touch display panel to perform the touch detection and output the touch detection data corresponding to the touch detection to the first pin of the driving circuit during the touch detection period.

6. The display device according to claim 4, wherein the timing control circuit comprises:
    a timing controller, coupled to the second pin, and configured to output the display data to the second pin of the timing control circuit during the display period; and
    a micro control unit, coupled to the second pin, so as to receive the touch detection data corresponding to the touch detection during the touch detection period.

7. An operation method of a display device comprising a touch display panel, a driving circuit and a timing control circuit, comprising:
    outputting, by the timing control circuit, display data through a data transmission path between the timing control circuit and the driving circuit during a display period;
    driving, by the driving circuit, the touch display panel according to the display data, so as to display an image frame on the touch display panel;
    driving, by the driving circuit, the touch display panel, so as to perform touch detection; and
    outputting, by the driving circuit, touch detection data corresponding to the touch detection through the same data transmission path between the timing control circuit and the driving circuit during a touch detection period.

8. The operation method according to claim 7, wherein the driving circuit comprises a touch with display driver integration chip.

9. The operation method according to claim 7, further comprising:
    driving, by the driving circuit, the touch display panel during the display period, so as to display the image frame; and
    driving, by the driving circuit, the touch display panel during the touch detection period, so as to perform the touch detection.

10. The operation method according to claim 7, wherein the display device further comprises a wire, two ends of the wire are respectively coupled to a first pin of the driving circuit and a second pin of the timing control circuit, and the operation method further comprises:
    outputting, by the timing control circuit, the display data to the driving circuit through the second pin, the wire and the first pin during the display period; and
    outputting, by the driving circuit, the touch detection data to the timing control circuit through the first pin, the wire and the second pin during the touch detection period.

11. A driving circuit, comprising:
    a first pin;
    a display driving circuit, coupled to the first pin, so as to receive display data through a data transmission path between a second pin of a timing control circuit and the first pin of the driving circuit during a display period, and configured to drive a touch display panel to display an image frame on the touch display panel according to the display data; and a touch driving circuit, coupled to the same first pin, and configured to drive the touch display panel to perform touch detection and output touch detection data corresponding to the touch detection through the same data transmission path between the same second pin of the timing control circuit and the same first pin of the driving circuit during a touch detection period.

12. A timing control circuit, comprising:
a second pin;
a timing controller, coupled to the second pin, and configured to output display data through a data transmission path between the second pin of the timing control circuit and a first pin of a driving circuit during a display period; and
a micro control unit, coupled to the same second pin, and configured to receive touch detection data corresponding to touch detection through the same data transmission path between the same second pin of the timing control circuit and the same first pin of the driving circuit during a touch detection period.

* * * * *